(12) United States Patent
Bocharov et al.

(10) Patent No.: US 8,996,547 B2
(45) Date of Patent: Mar. 31, 2015

(54) DYNAMIC FRAGMENTATION OF DIGITAL MEDIA

(75) Inventors: John A. Bocharov, Seattle, WA (US);
Geqiang Zhang, Redmond, WA (US);
Gurpratap Virdi, Bellevue, WA (US);
Vishal Sood, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 12/262,593

(22) Filed: Oct. 31, 2008

(65) Prior Publication Data

US 2010/0114921 A1    May 6, 2010

(51) Int. Cl.
| | |
|---|---|
| *G06F 17/30* | (2006.01) |
| *H04L 29/06* | (2006.01) |
| *H04N 21/845* | (2011.01) |
| *H04N 21/2343* | (2011.01) |
| *H04N 21/442* | (2011.01) |
| *H04N 21/658* | (2011.01) |
| *H04N 21/858* | (2011.01) |

(52) U.S. Cl.
CPC ...... *H04L 65/4084* (2013.01); *H04L 29/06027* (2013.01); *H04N 21/8456* (2013.01); *H04N 21/23439* (2013.01); *H04N 21/44209* (2013.01); *H04N 21/6581* (2013.01); *H04N 21/8586* (2013.01); *H04L 65/602* (2013.01)
USPC ........... 707/758; 707/706; 707/713; 707/722; 707/736; 707/781; 709/230; 709/219; 715/716

(58) Field of Classification Search
USPC ................. 707/706, 713, 722, 736, 758, 781, 707/999.01; 709/230, 219; 715/716
See application file for complete search history.

(56) References Cited

U.S. PATENT DOCUMENTS

| | | | |
|---|---|---|---|
| 6,574,625 B1 * | 6/2003 | Bates et al. | 707/749 |
| 7,337,231 B1 | 2/2008 | Li | 709/231 |
| 7,373,406 B2 | 5/2008 | Jones et al. | |

(Continued)

FOREIGN PATENT DOCUMENTS

| | | |
|---|---|---|
| CN | 1193243 | 9/1998 |
| CN | 101083568 | 12/2007 |

(Continued)

OTHER PUBLICATIONS

International Search Report dated May 25, 2010 cited in Application No. PCT/US2009/060984.

(Continued)

*Primary Examiner* — Syling Yen
(74) *Attorney, Agent, or Firm* — Ben Tabor; Kate Drakos; Micky Minhas

(57) ABSTRACT

Media fragmentation may be provided. First, a request for a manifest may be received from a client. Then, in response to the received request for the manifest, the manifest may be sent to the client. Next, a request may be received from the client for a file fragment. The request may indicate a start time and an end time corresponding to the file fragment. The request may be in a format defined by the manifest. Then a lookup table may be queried for a first byte location in a media file corresponding to the start time and a second byte location in the media file corresponding to the end time. Next, a portion of the media file between the first byte location and the second byte location may be extracted from the media file. The portion may comprise the file fragment. The file fragment may be sent to the client.

16 Claims, 4 Drawing Sheets

(56) References Cited

U.S. PATENT DOCUMENTS

| | | | |
|---|---|---|---|
| 7,401,220 | B2 | 7/2008 | Bolosky et al. .............. 713/165 |
| 2002/0107968 | A1* | 8/2002 | Horn et al. .................. 709/230 |
| 2004/0064573 | A1 | 4/2004 | Leaning et al. |
| 2006/0155790 | A1 | 7/2006 | Jung et al. |
| 2006/0159109 | A1* | 7/2006 | Lamkin et al. .............. 370/401 |
| 2007/0073878 | A1* | 3/2007 | Issa ............................. 709/225 |
| 2007/0130210 | A1 | 6/2007 | Park ......................... 707/104.1 |
| 2007/0162568 | A1* | 7/2007 | Gupta et al. ................ 709/219 |
| 2007/0260743 | A1 | 11/2007 | Oijer ............................ 709/231 |
| 2007/0261092 | A1 | 11/2007 | Ozawa et al. |
| 2008/0126357 | A1 | 5/2008 | Casanova et al. |
| 2008/0133766 | A1 | 6/2008 | Luo |
| 2008/0172718 | A1 | 7/2008 | Bradley |
| 2008/0177893 | A1 | 7/2008 | Bowra et al. ................ 709/231 |
| 2009/0164902 | A1* | 6/2009 | Cohen et al. ................ 715/716 |

FOREIGN PATENT DOCUMENTS

| | | |
|---|---|---|
| CN | 101217638 | 7/2008 |
| KR | 10-0815618 B1 | 3/2008 |

OTHER PUBLICATIONS

Charles Krasic, "A Framework for Quality-Adaptive Media Streaming: Encode Once—Streat Anywhere," Feb. 2004, 194 pgs., http://www.cs.ubc.ca/~krasic/publications/krasic-phd.pdf.

Steve Horowitz, "Interactive Audio on the Web Review and Recommendations," Prepared by the Web Audio Working Group of the Interactive Audio Special Interest Group, Dec. 2002, 79 pgs., http://www.iasig.org/pubs/wawg-rpt.pdf.

Ranga S. Ramanujan et al., "Adaptive Streaming of MPEG Video over IP Networks," Proceedings of the 22$^{nd}$ IEEE Conference on Computer Networks (LCN'97), Nov. 1997, 12 pgs., http://citeseerx.ist.psu.edu/viewdoc/summary?doi=10.1.1.44.7540.

Siddhartha Chattopadhyay et al., "A Framework for Encoding and Caching of Video for Quality Adaptive Progressive Download," pp. 775-778, http://delivery.acm.org/10.1145/1300000/1291408/p775-chattopadhyay.pdf?key1=1291408&key2=1513899121&coll=GUIDE&dl=GUIDE&CFID=39185256&CFTOKEN=35856748.

Ismail Djama et al., "Adaptive Cross-layer Fragmentation for Reliable Wireless IPTV Services," 2006-2008, 4 pgs., http://www.labri.fr/perso/djama/rapports_articles_conf/GIIS07.pdf.

Michael Kaplan, "Sorting it all Out," 7 pgs., http://blogs.msdn.com/michkap/archive/2005/09/11/463444.aspx.

Susanne Boll et al., "MPEG-L/MRP: Adaptive Streaming of MPEG Videos for Interactive Internet Applications," 10 pgs., http://medien.informatik.uni-oldenburg.de/pubs/boll_MIS2000.pdf; Aug. 27, 2008.

Extended European Search Report dated May 7, 2013 cited in Application No. 09824007.0, 9 pgs.

Nikolaus Farber et al., "Adaptive Progressive Download Based on the MPEG-4 File Format," Journal of Zhejiang University Science A; An International Applied Physics & Engineering Journal, vol. 7, No. 1, Jan. 2006, pp. 106-111, XP019385056.

Chinese Second Office Action dated May 30, 2013 cited in Application No. 200980143847.2, 6 pgs.

Chinese First Office Action dated Nov. 22, 2012 cited in Application No. 200980143847.2, 13 pgs.

European Office Action dated Nov. 4, 2013 cited in Application No. 09 824 007.0, 5 pgs.

International Standard ISO/IEC 14496-12, Third Edition, "Information Technology—Coding of Audio-Visual Objects—Part 12: ISO base media file format," Internet Citation, Jan. 14, 2008, XP-002550011, http://www.imtc.org/about/historical_archives.asp., 118 pgs.

"Office Action Received in European Patent Application No. 09824007.0", Mailed Date: Nov. 4, 2013, Filed Date: Oct. 16, 2009, 5 Pages.

"Notice of Allowance Received in Australian Patent Application No. 2009309089", Mailed Date: May 2, 2014, Filed Date: Oct. 16, 2009, 2 Pages.

European Summons to Attend Oral Proceedings dated Oct. 17, 2014 cited in Application No. 09824007.0, 10 pgs.

Per Frojdh et al., "Proposed re-structured ISO Base Media File Format," 83. MPEG Meeting; Jan. 14, 2008 -Jan. 18, 2008; Antalya; (Motion Picture Expert Group or ISO/IEC JTC1/SC29/WG11), No. M15093, Jan. 9, 2008, XP030043690, 119 pgs.

Australian Office Action dated Mar. 11, 2014 cited in Application No. 2009309089, 3 pgs.

* cited by examiner

DYNAMIC FRAGMENTATION OF DIGITAL MEDIA

BACKGROUND

Streaming audio is a process for playing audio and/or video files from the Internet. A plurality files are played at an end-user client in the order they arrive from a content server. The files are not preserved on the end-user client, so a network connection must be sustained to keep receiving the files. In other words, with streaming, files are constantly received by, and normally presented to, the end-user client while the files are being delivered by a provider from the content server. Streaming relies on physically fragmenting a content file in to the plurality of files comprising short-duration fragments on a disk. However, this fragmenting process creates several thousand files per hour of content associated with the content file, making resulting content file libraries difficult to manage due to the large number of files.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Media fragmentation may be provided. First, a request for a manifest may be received from a client. Then, in response to the received request for the manifest, the manifest may be sent to the client. Next, a request may be received from the client for a file fragment. The request may indicate a start time and an end time corresponding to the file fragment. The request may be in a format defined by the manifest. Then a lookup table may be queried for a first byte location in a media file corresponding to the start time and a second byte location in the media file corresponding to the end time. Next, a portion of the media file between the first byte location and the second byte location may be extracted from the media file. The portion may comprise the file fragment. The file fragment may be sent to the client.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
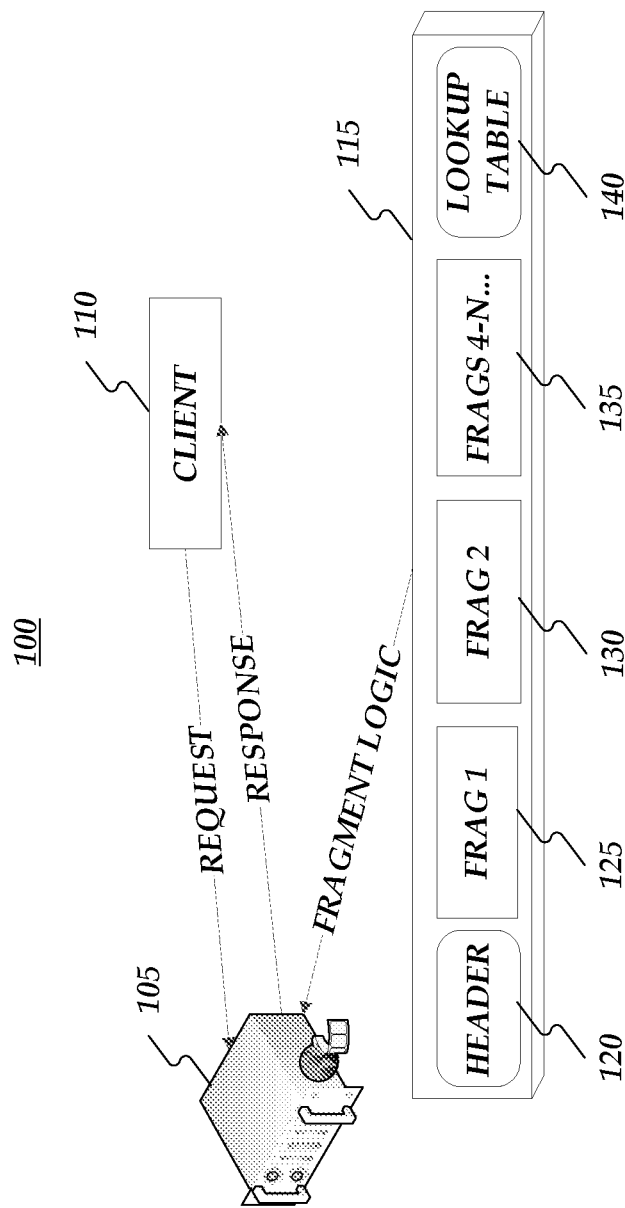
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Dynamic fragmentation of digital media for delivery with, for example, HTTP-based progressive download, may be provided. Consistent with embodiments of the present invention, a file format, a transmission (e.g. wire) format, and server logic may be provided to efficiently deliver short-duration fragments from a media file that is not physically fragmented on a disk. Conventional systems rely on physically fragmenting files involved into short-duration fragments on the disk. However, this may create several thousand files per hour of content, making resulting libraries difficult to manage. Short-duration fragments (e.g. on the wire) may allow the data to be effectively cached by proxies, leverage load-balancing to scale-out delivery, and provide flexibility for algorithms used.

FIG. 1 is a block diagram of an operating environment including a media fragmentation system 100. Media fragmentation 100 may include a server 105, a client 110, and a media file 115. Media file 115 may be stored on server 105. Media file 115 may include a header 120, a first fragment 125, a second fragment 130, an nth fragment 135, and a lookup table 140. Client 110 may be operated by a user wishing to view content corresponding to media file 115. Server 105 may provide the content corresponding to media file 115 to client 110. Server 105 may be implemented using a computing device 400 and client 110 may be implemented using other computing devices 418 as described in more detail below in FIG. 4.

Figure 2:
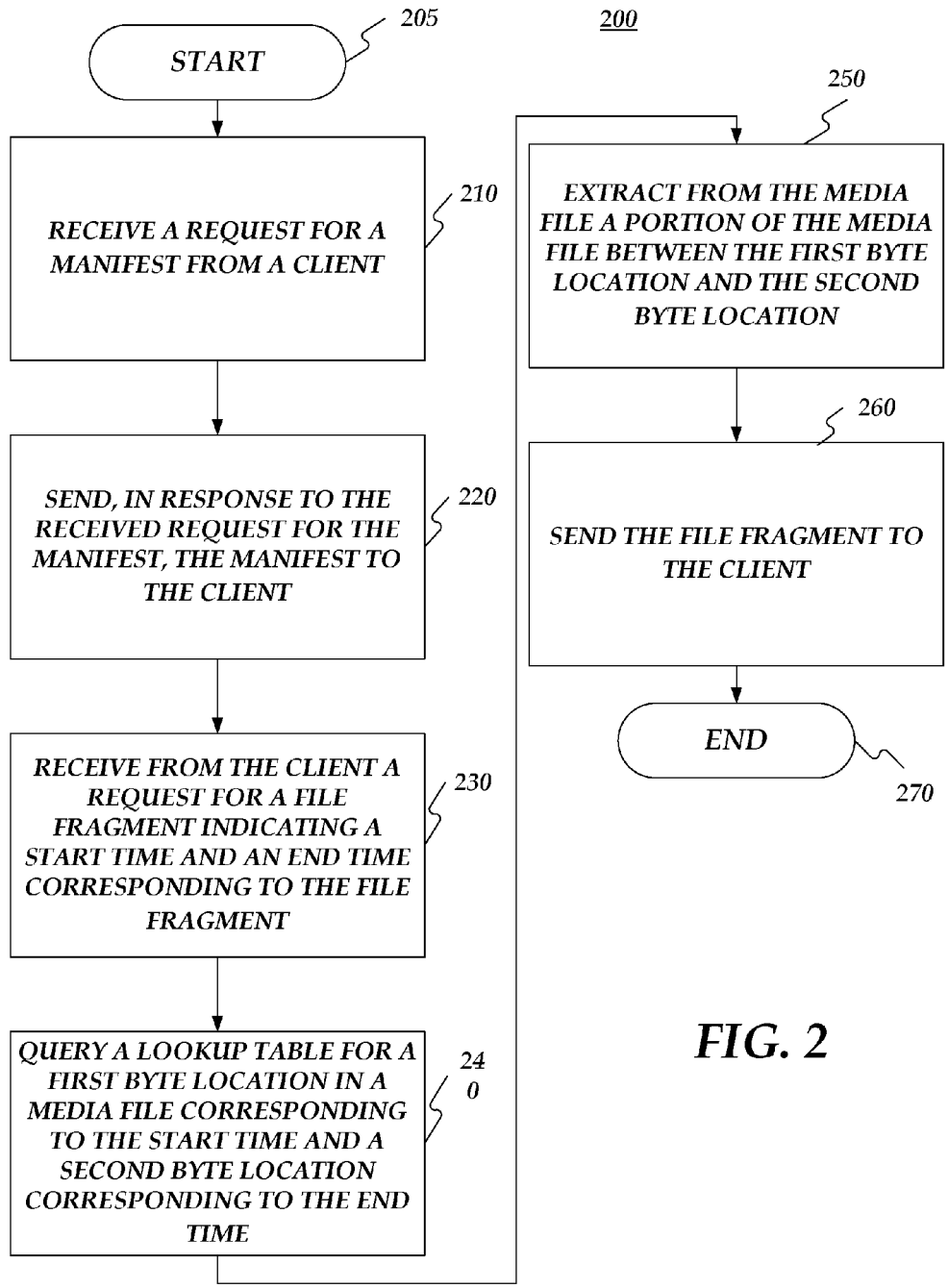
FIG. 2 is a flow chart of a method for providing media fragmentation.

FIG. 2 is a flow chart setting forth the general stages involved in a method 200 consistent with embodiments of the invention for providing media fragmentation. Method 200 may be implemented using server 105, as described above. Ways to implement the stages of method 200 will be described in greater detail below.

Figure 3:
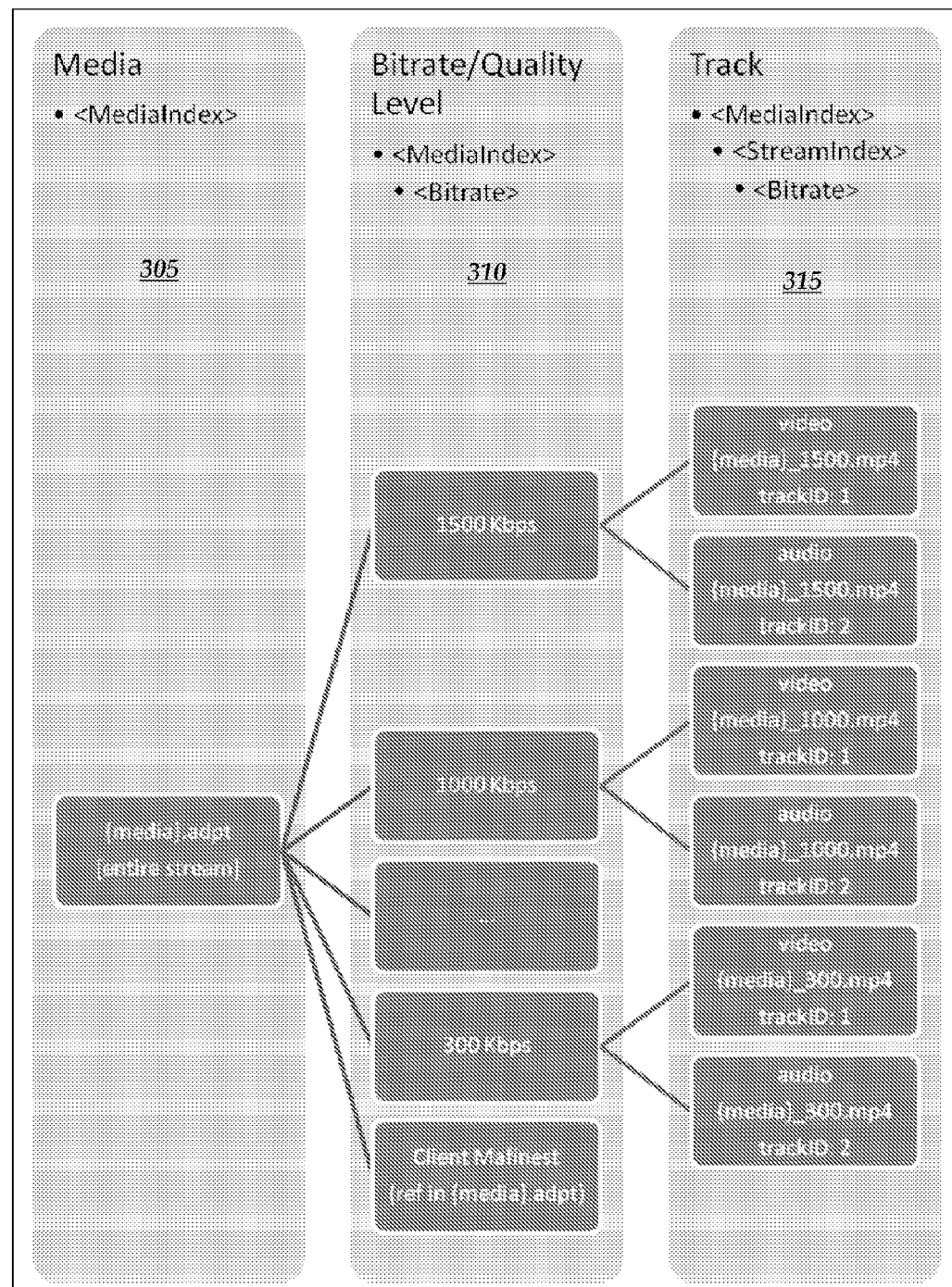
FIG. 3 illustrates a file layout for a manifest.

Method 200 may begin at starting block 205 and proceed to stage 210 where server 105 may receive a request from client 110 for a manifest 300 as described with respect to FIG. 3. For example, manifest 300 may specify different quality levels 310 (e.g. aggregate bitrates) that content corresponding to media file 115 may be streamed. Also, manifest 300 may specify tracks 315 that each quality level may correspond. Quality levels 310 may comprise, but are not limited to, providing fragments at the following bitrates: 1500 Kbps; 1000; Kbps; or 300 Kbps. Also, tracks 315 may comprise, but are not limited to, audio, video, and closed captioning. In addition, manifest 300 may describe a convention, for example, a Uniform Resource Locator (URL) convention. Client 110 may use this convention when asking server 105 for file fragments corresponding to media file 115. FIG. 3 illustrates an example for a file layout for manifest 300.

From stage 210, where server 105 receives the request for manifest 300, method 200 may advance to stage 220 where server 105 may send, in response to the received request, manifest 300 to client 110. For example, as stated above, manifest 300 may describe various quality levels available to client 110. Consequently, server 105 may send client 110 manifest 300 that describes information (e.g. media file 115) that is available on server 105 and how client 110 may acquire the information.

Once server 105 sends manifest 300 to client 110 in stage 220, method 200 may continue to stage 230 where server 105 may receive from client 110 a request for a file fragment. The request may be in a format defined by the manifest. When creating the request, client 110 may take into account the convention described by manifest 300. For example, client 110 may construct the request in a URL format. The request may have at a highest level, a name of a content the user wishes to view (e.g. a movie name.) At a next level the request may indicate a desired bitrate/quality level (e.g. 1500 Kbps.) And at a subsequent level, the request may indicate a track (e.g. video.) At an even subsequent level, the request may indicate a start time and an end time corresponding to the file fragment associated with the content named in the request, for example.

Client 110 may make successive requests corresponding to successive portions in time of the content. Furthermore, client 110 may evaluate bandwidth available to client 110 on a network (not shown) connecting client 110 to server 105. Based upon the evaluate bandwidth, client 110 may increase or decrease the bitrate/quality level in the requests. For example, client 110 may construct a request asking for video at 1.5 megabits per second from 0 seconds to 2 seconds of a movie. Then, client 110 may construct a next request asking for video at 1.5 megabits per second from 2 seconds to 4 seconds of the movie. After determining that a bottleneck exists on the network connecting client 110 to server 105, client 110 may construct a subsequent request asking for video at 500 kilobits per second from 4 seconds to 6 seconds. The bitrate/quality level may be reduced due to the determined bottleneck.

After server 105 receives the request for the file fragment in stage 230, method 200 may proceed to stage 240 where server 105 may query lookup table 140 for a first byte location in media file 115 corresponding to the start time and a second byte location in media file 115 corresponding to the end time. For example, server 105 may receive a request asking for video at 1.5 megabits per second from 0 seconds to 2 seconds of a particular movie. From header 120, server 105 may determine that this request corresponds to media file 115. Then, server 105 may cache lookup table 140 in a memory in server 105. Server 105 may then query lookup table 140 with the start time (e.g. 0 seconds) and the end time (e.g. 2 seconds.) In response to the query, lookup table 140 may correspondingly return the first byte location (e.g. byte position 30000) in media file 115 of first fragment 125 and the second byte location (e.g. byte position 60000) in media file 115 of first fragment 125.

Once server 105 queries lookup table 140 in stage 240, method 200 may continue to stage 250 where server 105 may extract, from media file 115, a portion of media file 115 between the first byte location and the second byte location. The portion may comprise first fragment 125. For example, rather than keeping data corresponding to first fragment 125, second fragment 130, and nth fragment 135 as completely separate files on server 105, server 105 may look-up the location of these fragments in contiguous media file 115 and then extract the data corresponding to the fragments from media file 115 per request.

After server 105 extracts the portion of media file 115 in stage 250, method 200 may proceed to stage 260 where server 105 may send the extracted data corresponding to first fragment 125 to client 110. Furthermore, for subsequent requests from client 110, server 105 may look-up locations of fragments corresponding to the subsequent requests in contiguous media file 115 and then extract data corresponding to corresponding fragments from media file 115 per the subsequent requests. Once server 105 sends the file fragment to client 110 in stage 260, method 200 may then end at stage 270.

An embodiment consistent with the invention may comprise a system for providing media fragmentation. The system may comprise a memory storage and a processing unit coupled to the memory storage. The processing unit may be operative to receive a request for a manifest from a client and to send, in response to the received request for the manifest, the manifest to the client. Furthermore, the processing unit may be operative to receive from the client a request for a file fragment. The request may indicate a start time and an end time corresponding to the file fragment. The request may be in a format defined by the manifest. Moreover, the processing unit may be operative to query a lookup table for a first byte location in a media file corresponding to the start time and a second byte location in the media file corresponding to the end time. In addition, the processing unit may be operative to extract from the media file a portion of the media file between the first byte location and the second byte location. The portion may comprise the file fragment. Also, the processing unit may be operative send the file fragment to the client.

Another embodiment consistent with the invention may comprise a system for providing media fragmentation. The system may comprise a memory storage and a processing unit coupled to the memory storage. The processing unit may be operative to receive a request for a file fragment. The request may indicate a start time and an end time corresponding to the file fragment. The request may be in a format defined by a manifest. The manifest may describe available tracks corresponding to available quality levels. The processing unit may be further operative to cache a look-up table in the memory storage of a server. Moreover, the processing unit may be operative to query the cached lookup table for a first byte location in a media file corresponding to the start time and a second byte location in the media file corresponding to the end time. In addition, the processing unit may be operative to extract from the media file a portion of the media file between the first byte location and the second byte location. The portion may comprise the file fragment.

Yet another embodiment consistent with the invention may comprise a system for providing media fragmentation. The system may comprise a memory storage and a processing unit coupled to the memory storage. The processing unit may be operative to receive a request for a manifest from a client and to send, in response to the received request for the manifest, the manifest to the client. The manifest may describe a format and available tracks corresponding to available quality levels. Furthermore, the processing unit may be operative to receive from the client a request for a file fragment. The request may indicate a start time and an end time corresponding to the file fragment. The request may be in the format defined by the manifest. The request may indicate a track and a quality level corresponding to the file fragment. In addition, the processing unit may be operative to cache a look-up table in the memory storage and to query the cached lookup table for a first byte location in a media file corresponding to the start time and a second byte location in the media file corresponding to the end time. Moreover, the processing unit may be operative to extract from the media file a portion of the media file between the first byte location and the second byte location. The portion may comprise the file fragment corresponding to the indicated track and quality level. In addition, the processing unit may be operative to send the file fragment to the client.

Figure 4:
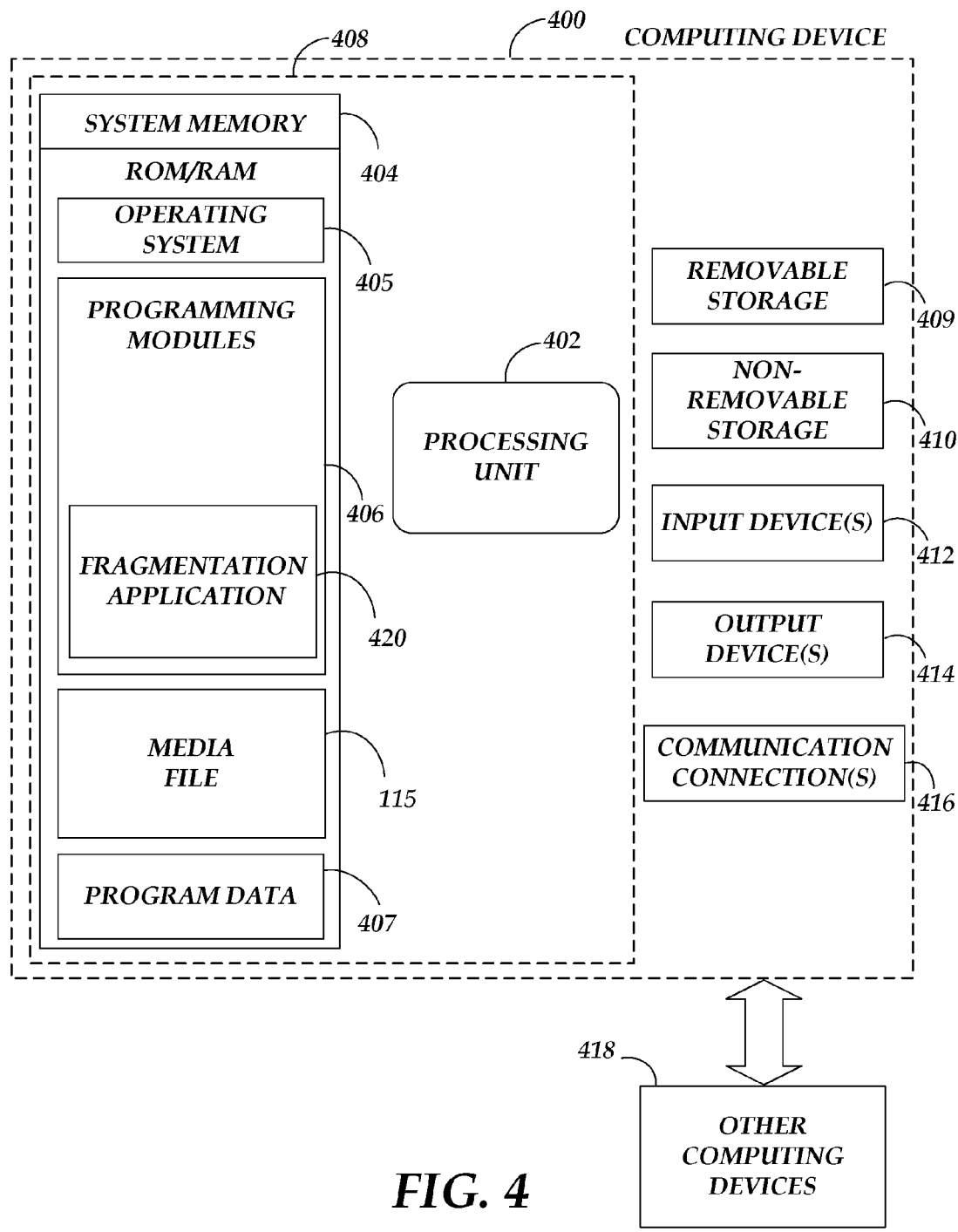
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418 (e.g. client 110), in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407 and media file 115. Operating system 405, for example, may be suitable for controlling computing device 400's operation. In one embodiment, programming modules 406 may include, for example a fragmentation application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. fragmentation application 420) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing media fragmentation, the method comprising:
   receiving, from a client, at a server, a first request for a manifest;
   sending, in response to the received first request for the manifest, the manifest to the client, wherein the manifest comprises a description of at least one quality level of a file fragment corresponding to a media file, a description of the media file, and client instructions for requesting the media file from the server, the instructions defining a convention for structuring a uniform resource locator (URL) employed in requesting the media file from the server, the URL being structured;
   receiving from the client a second request for the file fragment, wherein the second request is provided in accordance with the convention defined by the manifest, the second request indicating:
   the at least one quality level for the file fragment;
   in response to receiving the second request for the file fragment, determining an availability of the at least one quality level based upon, in part, available bandwidth to the client; and
   in response to determining the availability of the at least one quality level, adjusting the at least one quality level for the file fragment to an available quality level, wherein the at least one quality level differs from the available bandwidth to the client.

2. The method of claim 1, wherein sending the manifest comprises sending the manifest describing media available to the client.

3. The method of claim 1, wherein sending the manifest comprises sending the manifest indicating a plurality of titles corresponding to media available to the client.

4. The method of claim 1, sending the manifest describing at least one available quality level of a file fragment comprises providing the fragment at the following bitrates: 1500 Kbps, 1000 Kbps, and 300 Kbps.

5. The method of claim 4, wherein sending the manifest comprises sending the manifest describing available tracks corresponding to the available quality levels.

6. The method of claim 1, wherein sending the manifest comprises sending the manifest describing available tracks corresponding to available quality levels, the available tracks comprising at least one of the following: audio, video, and closed captioning.

7. The method of claim 1, wherein receiving from the client the second request for the file fragment, wherein the second request is provided in accordance with the convention defined by the manifest, the second request indicating a quality level for the file fragment, the quality level being configured to provide the fragment at one of the following bitrates: 1500 Kbps, 1000 Kbps, and 300 Kbps.

8. The method of claim 1, wherein receiving from the client the second request for the file fragment, wherein the second request is provided in accordance with the convention defined by the manifest, the second request indicating a track for the file fragment.

9. The method of claim 1, wherein receiving from the client the second request for the file fragment, wherein the second request is provided in accordance with the convention defined by the manifest, the second request indicating a track for the file fragment, the track comprising one of the following: audio, video, and closed captioning.

10. The method of claim 1, further comprising caching the look-up table in the memory of a server, wherein querying the lookup table comprises querying the cached lookup table.

11. The method of claim 1, wherein defining the format for requesting the media file from the server comprises defining the format that specifies a name of requested content, a quality level of the requested content, and a type of track associated with the requested content.

12. A computer-readable storage medium which stores a set of instructions which when executed performs a method for providing media fragmentation, the method executed by the set of instructions comprising:

receiving a request from the client for the manifest; and sending, in response to the received request for the manifest, the manifest to the client, wherein the manifest comprises a description of at least one available quality level of a file fragment corresponding to a media file, a description of the media file, and client instructions for requesting the media file from the server, the instructions defining a convention for structuring a uniform resource locator (URL) employed in requesting the media file from the server, the URL being structured, in accordance with the convention, to reflect the file fragment and the quality level of the file fragment;

receiving a request for a file fragment of a media file, the request being in a format defined by a manifest, a convention for structuring a uniform resource locator (URL) employed in requesting the file fragment, the URL being structured, in accordance with the convention, to reflect the file fragment of the media file and a quality of the file fragment;

in response to receiving the request for the file fragment, determining an availability of the at least one quality level based upon, in part, available bandwidth to the client; and in response to determining the availability of the at least one quality level, adjusting the at least one quality level for the file fragment to an available quality level, wherein the at least one quality level differs from the available bandwidth to the client.

13. A computer-readable storage medium of claim 12, wherein receiving the request comprises receiving the request indicating a track for the file fragment, the track comprising one of the following: audio, video, and closed captioning, the request indicating the quality for the file fragment, the quality level being configured to provide the fragment at one of the following bitrates: 1500 Kbps, 1000 Kbps, and 300 Kbps.

14. A computer-readable storage medium of claim 12, further comprising sending the file fragment to a client that requested the file fragment.

15. The computer-readable storage medium of claim 12, wherein receiving the request for the file fragment further comprises receiving the request indicating a name of content associated with the requested file fragment and a type of track associated with the requested file fragment.

16. A system for providing media fragmentation, the system comprising:

a memory storage; and a processing unit coupled to the memory storage, wherein the processing unit is operative to:

receive a first request for a manifest from a client;

send, in response to the received first request for the manifest, the manifest to the client, the manifest comprising a description of at least one available quality level of a file fragment corresponding to a media file, a description of the media file, and client instructions for requesting a media file from the server, the instructions describing a uniform resource locator (URL) format for requesting file fragments, the URL format specifying a requested quality level of the file fragments and a type of track associated with the file fragments;

receive from the client a second request for a file fragment, the second request indicating a start time and an end time corresponding to the file fragment, the second request being in the format defined by the manifest, the second request indicating a track and a quality level corresponding to the file fragment;

determine an availability of the at least one quality level based upon, in part, available bandwidth to the client in response to the request for the file fragment;

adjust the at least one quality level for the file fragment to an available quality level in response to determining the availability of the at least one quality level, wherein the at least one quality level differs from the available bandwidth to the client.

* * * * *